(12) United States Patent
Smith

(10) Patent No.: US 8,210,478 B2
(45) Date of Patent: Jul. 3, 2012

(54) AIRCRAFT WITH OPTIMIZED USABLE VOLUME AND METHOD TO OPTIMIZE THE USABLE VOLUME OF AN AIRCRAFT

(75) Inventor: Garrett Smith, Colomiers (FR)

(73) Assignee: Airbus, Blagnac (FR)

( * ) Notice: Subject to any disclaimer, the term of this patent is extended or adjusted under 35 U.S.C. 154(b) by 680 days.

(21) Appl. No.: 12/377,031

(22) PCT Filed: Aug. 16, 2007

(86) PCT No.: PCT/EP2007/058534
§ 371 (c)(1),
(2), (4) Date: Feb. 10, 2009

(87) PCT Pub. No.: WO2008/022965
PCT Pub. Date: Feb. 28, 2008

(65) Prior Publication Data
US 2010/0170997 A1    Jul. 8, 2010

(30) Foreign Application Priority Data
Aug. 18, 2006   (FR) ..................................... 06 53398

(51) Int. Cl.
*B64D 37/04* (2006.01)

(52) U.S. Cl. .................. 244/135 R; 244/118.5; 244/120
(58) Field of Classification Search ............... 244/118.1, 244/120, 137.2, 118.5, 135 R, 135 B; 52/64; 220/562–564, 810
See application file for complete search history.

(56) References Cited

U.S. PATENT DOCUMENTS

| | | | |
|---|---|---|---|
| 4,807,833 A | 2/1989 | Pori | |
| 5,094,409 A | 3/1992 | King et al. | |
| 5,190,246 A | 3/1993 | Mac Conochie | |
| 5,350,138 A | 9/1994 | Culbertson et al. | |
| 6,206,328 B1 | 3/2001 | Taylor | |
| 7,093,798 B2 * | 8/2006 | Whelan et al. | 244/120 |
| 7,234,667 B1 * | 6/2007 | Talmage, Jr. | 244/120 |

* cited by examiner

*Primary Examiner* — Tien Dinh
*Assistant Examiner* — Michael Kreiner
(74) *Attorney, Agent, or Firm* — Oblon, Spivak, McClelland, Maier & Neustadt, L.L.P.

(57) ABSTRACT

An aircraft including a fuselage including a cabin to accommodate persons and/or a load, and a propulsion system. The propulsion system includes at least one tank and/or one combustion chamber, wherein part of the propulsion system can be used as an extension of the cabin to accommodate persons and/or a load, the part of the propulsion system lying adjacent the cabin and separated from the cabin by a partition.

15 Claims, 5 Drawing Sheets

AIRCRAFT WITH OPTIMIZED USABLE VOLUME AND METHOD TO OPTIMIZE THE USABLE VOLUME OF AN AIRCRAFT

TECHNICAL AREA AND PRIOR ART

The present invention relates to an aircraft with effective inner volume that can be optimized, in particular to an airplane or spacecraft and to the use of part of a combustion system to optimize the usable space for passengers or goods, and to a method to optimize the usable space of an aircraft.

Aircraft, in particular airplanes and spacecraft, comprise a fuselage forming a shell which contains a cabin for passengers and/or load compartment and a fuel tank.

Cabin volume is limited. Yet for economic reasons it is sought to increase this volume, without however increasing aircraft weight, its manufacturing costs and its fuel consumption.

Aircraft fuel tanks are designed to allow aircraft to travel long distances. Yet an aircraft can also be solely used for short or medium haul flights. In this case, the fuel tank is not completely filled. This void space is dead space since it is not used during these short or long-range flights, whereas it could be used to carry additional passengers or goods, which would increase the aircraft's profitability.

In current aircraft, kerosene-type fuel is generally stored in the wings or in the fuselage. This fuel is in liquid form at all its operating temperatures and pressures.

For future aircraft and current spacecraft, fuel is hydrogen- or methane-based, which has to be stored in large tanks since their density is lower than the density of hydrocarbons. The oxidizer used for spacecraft is typically liquid oxygen, which also requires large tanks. Also, the tanks used are of spherical or cylindrical shape to maintain the pressure of the fuel or cryogenic oxidizer (liquid hydrogen, liquid methane or liquid oxygen).

In rockets of known type, the tank containing the fuel and oxidizer forms one stage of the rocket, which is jettisoned when empty. Only small tanks are provided for that part of the rocket intended to be placed in orbit, for the purpose of keeping the rocket in orbit and to command guiding of the rocket.

Spacecraft are known from documents U.S. Pat. Nos. 5,350,138 and 6,206,328 in which the tank lies outside the spacecraft fuselage, and which, after the fuel has been consumed, is used to extend the initial cabin space of the spacecraft when it is in orbit. For this purpose, a through tunnel is provided between the initial cabin and the interior of the external tank. However, this tank is not immediately available as additional living or storage space to store items other than fuel; it needs to be fitted out. Also, the spacecraft must be in orbit. Additionally, this cannot be applied to passenger aircraft or cargo aircraft whose fuel tank is generally contained in the fuselage.

An aircraft is also known in which it is possible to remove or add a tank in order to modify the aircraft's range, for its use as medium-haul or long-haul aircraft. Therefore the removal of a tank to use the aircraft for short- or medium-haul flights allows the available space inside the aircraft to be increased. However this modification only applies to cargo volume and not to passenger volume. Also the increase in available volume cannot be obtained during flight, and the space savings are therefore inoperative on long-hauls.

It is therefore an objective of the present invention to propose an aircraft whose usable volume available to passengers and/or loads can be swiftly increased, in particular for passenger aircraft, cargo aircraft on the ground or in flight and spacecraft as soon as the propellant combustion phase has been completed.

DESCRIPTION OF THE INVENTION

The abovementioned objective is reached with an aircraft in which it is possible to access part of the fuel tank when it is not in use, thereby increasing the available usable volume of the aircraft whilst maintaining an identical external structure. This increase in volume can take place during flight when the fuel contained in the tank has been used, thereby improving passenger comfort and available space, or on the ground when the tank is not fully used in order to increase the number of passengers and/or the volume of loaded goods.

Regarding spacecraft, the invention allows an additional space to be provided for crew, passengers, loads, animals, plants and scientific experiments, whilst using a spacecraft of the same size. Therefore, the weight of the craft is reduced relative to its usable volume, and it therefore consumes less fuel for flying, its manufacturing cost is also lower and less equipment is required compared with a larger-size craft of comparable usable volume.

Regarding an airplane, if the increase in usable volume is made on the ground, the invention allows the number of passengers or the volume of loaded goods to be increased or, if the increase is made during flight on long-hauls, passenger comfort can be increased.

Additionally, since it is possible to increase passenger comfort, it becomes possible to increase ticket prices, and hence to further increase the productivity of a commercial aircraft.

With respect to aircraft propelled by liquid hydrogen or methane, the fuel tanks can be arranged either side of the passenger cabin in a longitudinal direction of the aircraft. Also, with respect to aircraft propelled by "clean" fuel and oxidizer (hydrogen, nitrous oxide and oxygen), the tank can directly be used by passengers without the need to insulate its walls from the passengers.

For hydrocarbon-based fuel, a deformable membrane is provided to contain the fuel and insulate the tank walls from the fuel. Therefore, all that is required is to fold away the empty membrane in order to be able to use the tank as additional accommodation or storage space.

As a result, in spacecraft which up until now only offered very narrow cabin space, with the invention, this space can be substantially increased as soon as the fuel is expended and the inside of the tank adapted accordingly.

The present invention notably applies to tanks for solid or liquid type fuel or oxidizer (oxygen, hydrogen, nitrous oxide, kerosene, methane, HTPB or plastics).

The present invention can be used in rockets with suborbital spaceflight, to offer passengers sufficient space to take full advantage from the effect of reduced gravity. For orbital or interplanetary flight, crews will have the benefit of a larger workspace and rest accommodation as soon as the fuel contained in the tanks after take-off has been consumed.

In other words, access means are provided to access the inside of the tank from the passenger cabin, and outside access means to allow evacuation of passengers or goods towards the outside, means to drain the tank and means to furnish the inside of the tank for its use as space for passengers or storage of goods.

These furnishing means may for example include means to secure additional seats if such furnishing is carried out before take-off, inflatable means to form sleeper seats, linings to cover the bare walls of the tank.

The subject-matter of the present invention is therefore an aircraft comprising a fuselage with a cabin to receive persons and/or a load and propelling system, said propelling system comprising at least one tank or combustion chamber, in which part of the propelling system can be used as extension of said cabin to accommodate persons and/or a load, said part of the propelling system lying adjacent the cabin and separated from the cabin by a partition.

The propelling system may advantageously comprise at least two tanks, one convertible tank and one plain tank, said extension of the cabin concerning the convertible tank.

A filter is advantageously provided at the exit of said convertible tank to filter pollutants derived from passengers and/or loads stored in the tank, and thereby avoid any engine deterioration.

In another embodiment, the convertible tank has a flexible pouch to receive fuel or oxidizer and a container to contain the pouch, the container forming the extension of the cabin once the pouch has been folded away. In this manner, the cabin is not contaminated by the fuel or oxidizer, for example in aircraft propelled by kerosene. In addition, no pollution from passengers or carried loads can enter into the propelling force generation area.

The partition is advantageously reinforced to withstand the pressure exerted by the fuel in the pouch.

A flexible, spider-web type reinforcement surrounding the pouch could also be provided.

According to the present invention, the convertible tank may comprise at least one hatchway formed in the fuselage for passenger entry or exit and/or through which goods can be loaded, at least one emergency exit, a hatchway communicating with the cabin and drainage means for remaining fuel. Therefore, the extension of the cabin forms a cabin in its own right as safe as the original cabin.

In the event that the convertible tank comprises a pouch, the communicating hatchway between the tank and the cabin also comprises a shoulder on its outer contour, intended to bear against the partition in a tank-to-cabin direction under the load exerted by the fuel or oxidizer contained in the membrane.

Advantageously, the convertible tank comprises a floor on which passengers can walk or on which a load can be stowed. This floor is pre-installed making the fitting-out of the convertible tank quicker and easier.

The convertible tank may comprise securing means to fasten furnishings, and/or inflatable fittings which are to be inflated when the convertible tank is converted to a cabin extension, and/or fitting elements concealed in the walls of the convertible tank.

Preferably, the inflatable fittings comprise linings for the walls of the convertible tank.

The aircraft of the present invention may comprise an air distribution and circulation system between the cabin and the cabin extension. For example, said air distribution and circulation system comprises inflatable ducts on the side of the cabin extension.

The aircraft may be a passenger aircraft or a cargo aircraft.

The convertible tank and plain tank can then lie either side of the cabin, in a longitudinal direction of the aircraft.

The aircraft tanks may be intended to contain liquid hydrogen or liquid oxygen, or kerosene. If they contain kerosene, the convertible tank and the plain tank may partly lie in the wings and partly in the sidewalls of the aircraft, the convertible tanks being arranged in the aircraft's sidewalls.

The aircraft may also be a spacecraft.

The combustion chamber in this case can be the usable part of the propulsion system arranged aft of the cockpit in the direction of launch of the spacecraft, by closure of a throat.

Advantageously, a membrane is then provided intended to cover the walls of the combustion chamber when it is converted as a cabin extension, so that the passengers are isolated from the walls of the combustion chamber and combustion residues. The membrane can be deployed using a pneumatic source.

The spacecraft of the invention can be propelled using liquid nitrous oxide and hydroxyl-terminated polybutadiene (HTPB).

A further subject-matter of the present invention is the use of part of an aircraft's combustion system, arranged inside an aircraft fuselage, as cabin extension to accommodate persons and/or a load.

A further subject of the invention is a method to extend the cabin of an aircraft equipped with at least two tanks, comprising the step to convert one of the two tanks into a habitable area on the ground before take-off of the aircraft. During this step, platforms provided with seats can be fixed inside the tank.

A further subject of the present invention is a method to extend the cabin of an aircraft into part of a propulsion system of said aircraft, comprising a conversion step of said part of the propulsion system during flight.

If the aircraft's propulsion system comprises at least two tanks, the method can comprise the steps of:
 a) draining one of the almost empty tanks,
 b) installing the furnishing elements.

In one embodiment, between step a) and step b), there is a folding step of a pouch which previously contained fuel.

A further subject of the invention is a method to extend the cabin of an aircraft in which the propulsion system comprises a combustion chamber, including the steps of:
 a') closing a throat to isolate the combustion chamber from the aircraft's outer environment,
 b') setting up an atmosphere in the combustion chamber.

Between steps a') and b'), provision is advantageously made for deployment of a membrane to cover the inside of the combustion chamber, the atmosphere being set up inside this membrane.

BRIEF DESCRIPTION OF THE DRAWINGS

The present invention will be better understood with the help of the following description and appended drawings, in which.

DETAILED DESCRIPTION OF PARTICULAR EMBODIMENTS

The same references are used in the different embodiments to designate parts having the same function.

By tank in the present invention is meant a place to store fuel and/or a liquid, solid or gas oxidizer, it may be kerosene for example or nitrous oxide, liquid methane or liquid oxygen.

Figure 1:
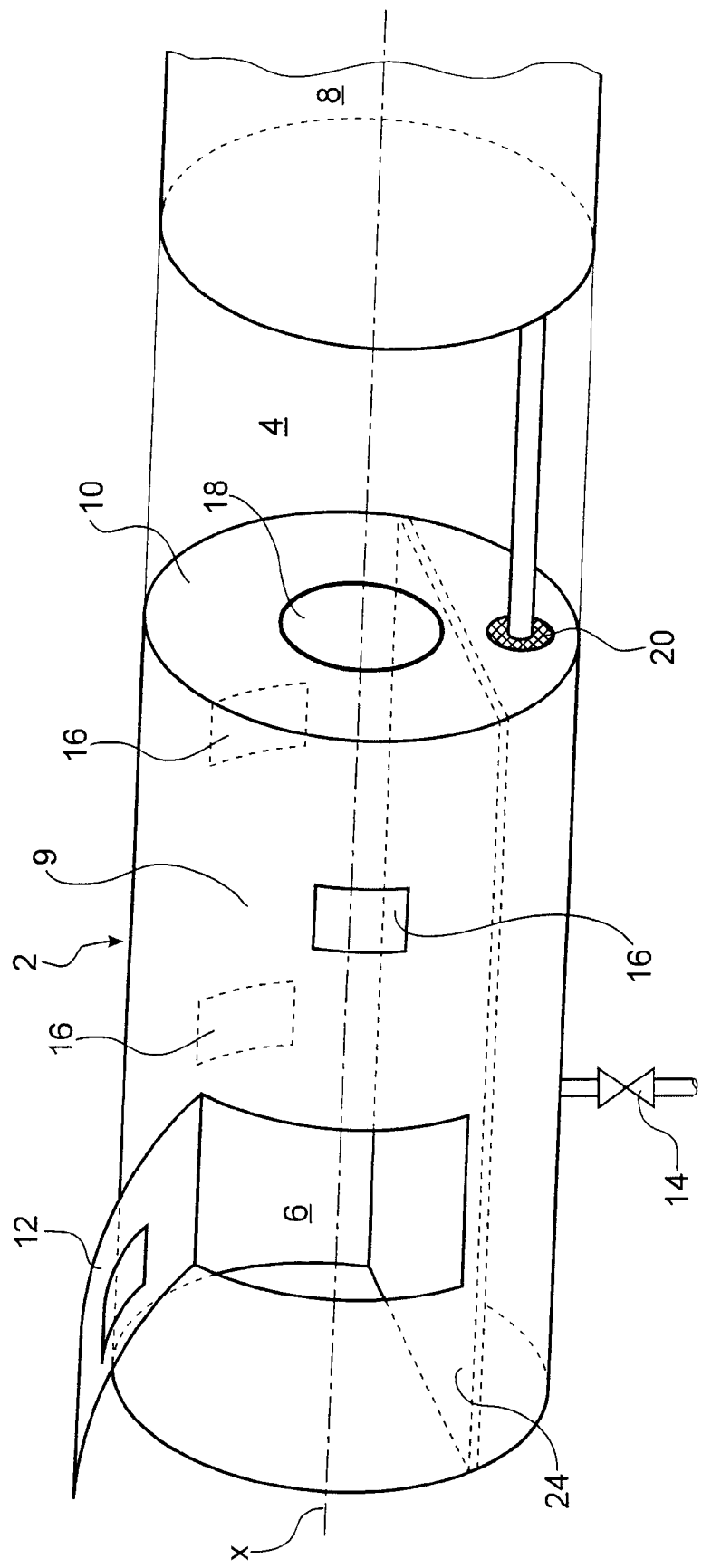
FIG. 1 is a perspective diagram of a portion of an airplane according to the present invention.

In FIG. 1, a first embodiment can be seen of an aircraft according to the present invention, comprising a fuselage 2 in which a passenger cabin 4 or passenger compartment is arranged, and at least two fuel tanks 6, 8.

The first tank 6 will be called the convertible tank and the second tank 8 will be designated a plain tank.

In this embodiment, the aircraft is an airplane carrying a propulsion system functioning with liquid hydrogen, and more generally an airplane propelled by "clean" fuel. In the present application, by clean fuel or oxidizer is meant a fuel or oxidizer which leaves no trace after its consumption, and which is non-toxic for human beings, such as liquid oxygen, nitrous oxide or liquid hydrogen.

The propulsion system comprises at least two tanks.

For an airplane propelled by liquid hydrogen, provision is made to arrange the fuel tanks either side of the passenger cabin 4 in a longitudinal direction X of the fuselage 2. Since this cryogenic fuel has a lower density than hydrocarbon-based fuels, it has to be contained in sealed pressurized tanks to optimize the overall performance level of the airplane. The lower density of cryogenic fuel requires large tanks, of greater size than kerosene tanks. The high pressure of cryogenic propellants or nitrous oxide also requires efficient tanks from a structural viewpoint. The most advantageous shapes to contain large volumes under high pressure are a sphere or cylinder. Airplane hydrogen or methane tanks are positioned in the fuselage and not in the wings. Also, a tank of spherical or cylindrical shape is more efficient for heat insulation since the surface area of the tank is reduced compared with its volume.

The passenger cabin 4 is separated from the convertible tank 6 by a wall 10.

The convertible tank 6 is delimited radially by a peripheral wall 9 formed by a portion of the fuselage 2.

According to the present invention, provision is made in this wall 9 for at least one access means 12 from outside, of hatchway type.

This hatchway 12 can be of small size to allow embarking and disembarking of passengers, or of large size to allow loading and unloading of goods, or to allow the installation and removal of entire platforms provided with seats to increase the seating capacity of the airplane. In the example shown, the hatchway 12 is of large size and comprises a hatchway of smaller size.

Fuel-proof means (not shown) are provided at the hatchway 12 to prevent any fuel leakage between the hatchway 12 and the fuselage 2.

If the hatchway is of small size, it has limited impact on the tank. On the other hand, with a large size opening, this must be adapted to reduce its impact on the mechanical resistance of the tank.

Provision is also made for at least one drainage means 14 of the convertible tank 6 to drain this tank completely of any residual fuel. This purge means 14 may be a valve for example, connecting the inside of the convertible tank 6 to the inside of tank 8, or the inside of the convertible tank 6 and the outside environment.

With respect to a convertible tank 6 intended to be used as additional cabin, emergency evacuation means 16 are provided which are distributed throughout the entire portion of the fuselage delimiting the convertible tank, to allow accelerated evacuation of passengers from the airplane. Sealing means such as described previously for the hatchway 12 are also provided at these evacuation doors 16. They may be of simpler structure since these access means 16 only have exceptional use and provision may be made to change these seals after each use of the emergency evacuation doors.

These emergency evacuation means comprise escape slides and/or means of known type, to allow quick, safe evacuation of passengers.

In the example illustrated, these evacuation doors are three in number, the hatchway 12 also forming an emergency exit in case of emergency. However, since their use is limited to exceptional cases, their structure is less complex than the structure of the hatchway 12 which, for example, may be intended to function on each flight.

According to the present invention, and in particular if the convertible tank is intended to be used as additional cabin space, provision is made for an access hatchway 18 in the wall 10 separating the passenger compartment 4 from the convertible tank 6. Therefore when the convertible tank 6 is empty, the passengers can take this hatchway 18 to access the additional space formed by the convertible tank.

Advantageously a filter 20 is also provided at a fuel exit valve of the convertible tank 6 in direction of the engines, to collect any pollutants brought through use of the convertible tank 6 as storage space or accommodation space, which even very thorough cleaning may not be able to remove.

Advantageously, a floor 24 is also provided for storage or for passenger movement. An airplane tank is effectively of tubular shape without any planar bottom part. The floor 24 is pre-installed in the convertible tank 6, dividing the inner volume of the convertible tank 6 into two volumes, one upper and one lower, communicating means being provided between the two volumes to allow fuel flow.

The convertible tank 6 also comprises means so that it can be fitted out as storage space or accommodation space.

If the convertible tank 6 is converted into additional cabin space on the ground i.e. when the airplane is intended for short-haul flights, and the convertible tank 6 is therefore not used as fuel tank, the inside of the convertible tank 6 then comprises means to allow the mounting of additional seats, for example the seats are mounted on platforms (not shown) which are loaded directly into the airplane via the large-size hatchway 12 and secured to the floor 24.

Regarding airplanes intended for long-haul flights, the convertible tank is filled with fuel at the start of the flight, and it is this tank which is first emptied, the fuel supply then being obtained from the plain tank 8. When the convertible tank 6 is empty, it can be converted during flight into additional accommodation space for the passengers, e.g. as sleeping space for the passengers.

The furnishing of the convertible tank 6 can be carried out using parts stored elsewhere in the airplane which are brought and installed in the convertible tank 6 when it is empty. However, this solution is relatively restrictive, since it requires the carrying and securing of the furnishing elements. Also these elements take up substantial usable volume, making the invention less advantageous. In this example, fast securing means of lug type 25 and furnishing means are provided on the floor 24 and walls of the convertible tank 6, which reduces the conversion time needed to convert the convertible tank 6.

Figure 2A:
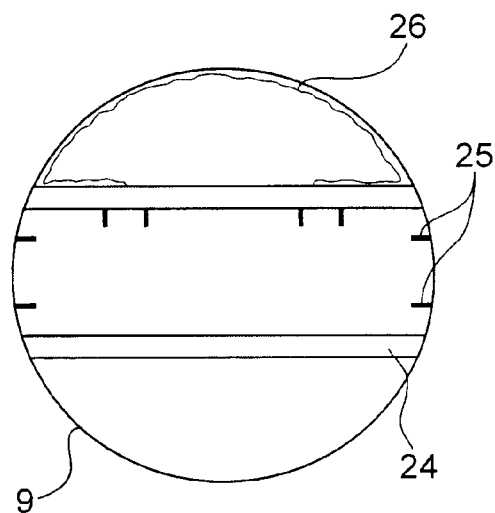
FIGS. 2A and 2B are cross-sectional views of a convertible tank according to the present invention in non-furnished state and furnished state.
Figure 2B:
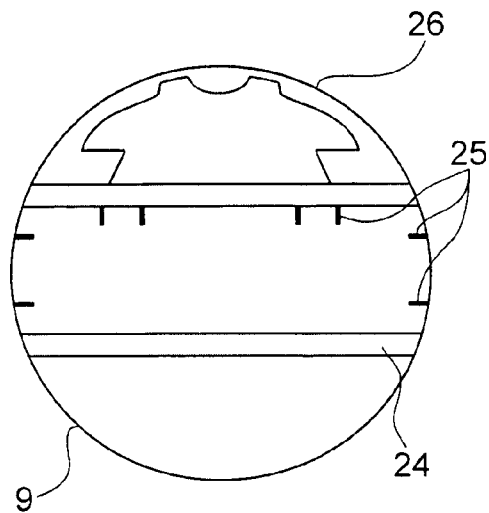

In particularly advantageous manner as shown in FIGS. 2A and 2B, provision may be made to use inflatable furnishing elements 26 e.g. linings for the inner wall of the convertible tank 6, seats and/or sleepers. These elements are then integrated in the wall of the convertible tank 6 and in the floor 24, and are deployed when the convertible tank is empty. These furnishing elements have the following advantages:

they are lightweight, they have practically no volume in a deflated state, thereby offering maximum fuel storage space in the convertible tank 6, they can be quickly deployed and deflated, making conversion of the convertible tank quick and easy both as accommodation space and as fuel tank.

In FIG. 2A, the inflatable furnishings are deflated, and in FIG. 2B the inflatable elements are deployed.

An example of savings in space obtained with the present invention will now be given below.

A convertible tank 6 can contain 150 m³ of liquid hydrogen, which corresponds to a weight of approximately 10 tonnes. This volume in aircraft conducting short-haul flights, for which the convertible tank is not used, can have its floor fitted out to accommodate additional passengers, for example by means of seating platforms as described previously. On average, 200 kg and 3 m³ are provided per passenger if a platform is used. As a result, the gain in passenger numbers is 50, which corresponds to a 10% increase in capacity for an airplane usually carrying 500 passengers. The profitability of the aircraft is therefore significantly increased.

A description will now be given of in-flight conversion of the convertible tank 6.

The two tanks 6, 8 are filled with fuel and the passengers are installed in the passenger cabin 4.

The airplane takes off and consumes the fuel contained in the convertible tank 6.

At a certain time during the flight, practically all the fuel initially contained in the convertible tank 6 has been used up. Fuel is then supplied by the plain tank 8.

The convertible tank 6 can then be drained by means 14.

Next, the inside of the convertible tank 6 can be fitted out to accommodate passengers. This fitting-out can be carried out automatically by inflating, or manually by mounting equipment stored elsewhere in the airplane.

The convertible tank 6 then forms additional cabin space which can be occupied by passengers.

For conversion to a tank, all that is required is to remove the equipment or to deflate the equipment and to close the communication door sealingly between the passenger cabin and the convertible tank 6.

Figure 3:
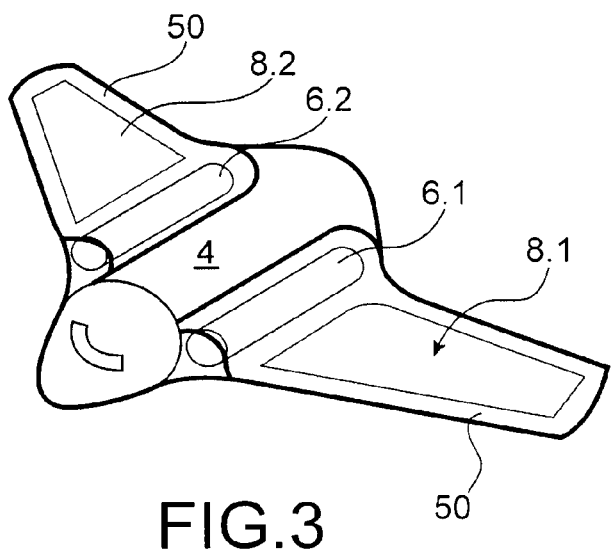
FIG. 3 is a perspective view of a variant of embodiment of an airplane according to the present invention.

In FIG. 3, a variant can be seen of an airplane embodiment according to the present invention, in which the fuel tanks 8.1, 8.2, 6.1, 6.2 are arranged in the wings 50 and partly in the sidewalls of the airplane inside the fuselage 2. The parts 6.1, 6.2 inside the fuselage can be converted into usable, additional space as just described.

Provision may be made for both tanks 6 and 8 to be convertible, the choice of tank to be converted being made according to needs.

Figure 4A:
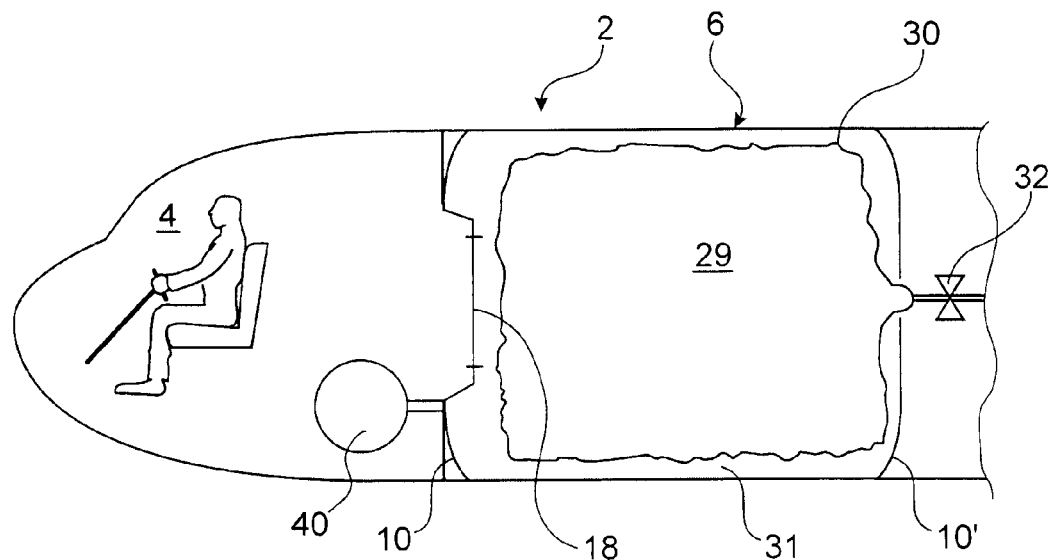
FIGS. 4A and 4B are diagrams of the inside of a spacecraft according to the present invention, when the habitable volume is limited to the cockpit and when it is extended into a tank.
Figure 4B:
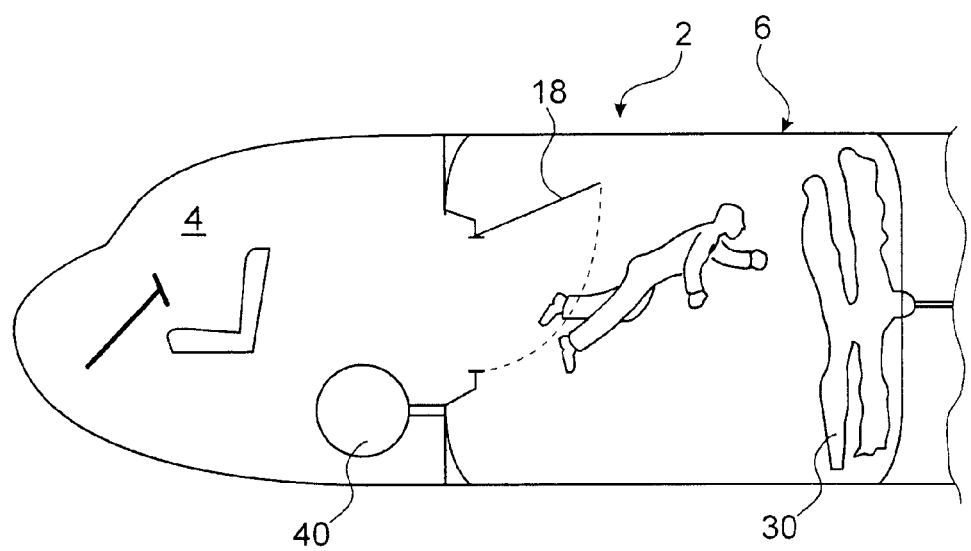

In FIGS. 4A and 4B, a second embodiment of the present invention can be seen, applied to a spacecraft, but it may also be applied to a passenger or cargo aircraft.

In the described embodiment, the spacecraft comprises hybrid propelling means using an oxidizer consisting of liquid nitrous oxide and HTPB fuel (Hydroxyl-terminated polybutadiene).

The oxidizer tank is arranged just aft of the cockpit 4. The fuel combustion chamber is not illustrated.

According to the present invention, the convertible tank 6 is a flexible pouch 29 formed of a sealed membrane 30 to contain the fuel and isolate it from the outside environment, arranged in a container 31.

This pouch 30 covers the inner walls of the container 31. When the pouch 29 is empty, it is folded away, for example by setting up a vacuum inside it to release the inner volume of the container as illustrated in FIG. 4B.

Liquid nitrous oxide can be stored at ambient temperature, therefore the membrane used 30 does not need to be provided with any particular insulation characteristics.

However, owing to the substantial pressure to which the membrane 30 is subjected at a temperature of 20° C., advantageously provision is made for mechanical reinforcement of the membrane.

In a first example of embodiment, the walls of the container 31 have sufficient mechanical properties to withstand this pressure.

Figure 5A:
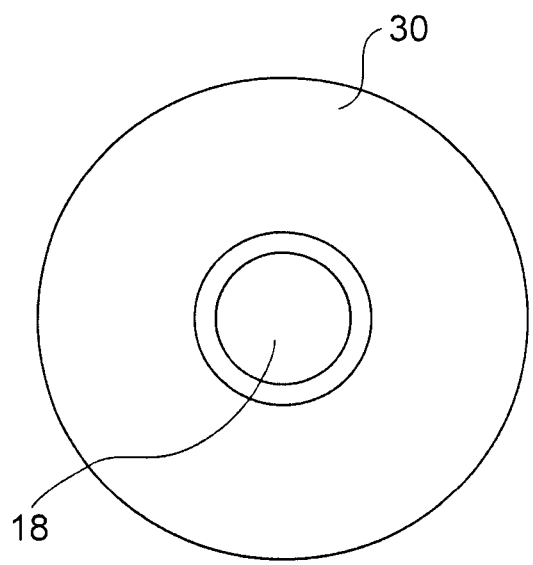
FIGS. 5A and 5B are front and cross-sectional views of a partition adapted for the tank in FIGS. 4A and 4B.
Figure 5B:
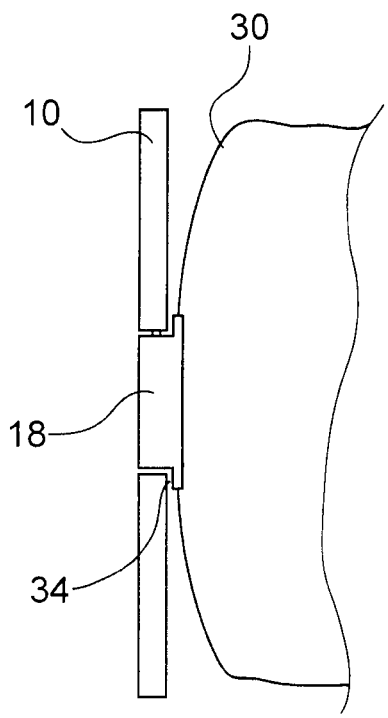

In particular, provision is made for a separating partition 10 between the cockpit and the convertible tank 6, which has sufficient mechanical properties to resist this pressure, the membrane 30 bearing against the wall 10 as illustrated in FIGS. 5A and 5B. A partition 10' also having the properties of partition 10 is provided to delimit the other end of the fuel tank. With regard to the fuselage, this is generally designed to withstand such pressures taking into account outside forces.

In the example illustrated in FIGS. 5A and 5B, the access to the inside of the convertible tank 6 is closed when the pouch is filled with fuel, via a hatchway 18 which comprises a shoulder 34 over its entire outer periphery, mounted in the throughway of the partition 10 so that it bears against the edge of the passageway to form a closed planar wall to support the membrane 30.

When the pouch 29 is empty, there is no longer any force applied against the hatchway 18, which is removed together with the membrane 30.

In this example, the hatchway 18 is joined to the membrane 30. However provision may be made for the hatchway 18 to be joined to the partition 10 via hinges as illustrated in FIG. 4B.

Tanks containing propellants are provided in aircraft in orbit for de-orbiting of the aircraft. They are therefore full and are not available for conversion. A tank for the de-orbiting propellants is therefore provided that is separate from the main tank for launching, to allow use of the main tank as soon as it is empty.

Figure 6:
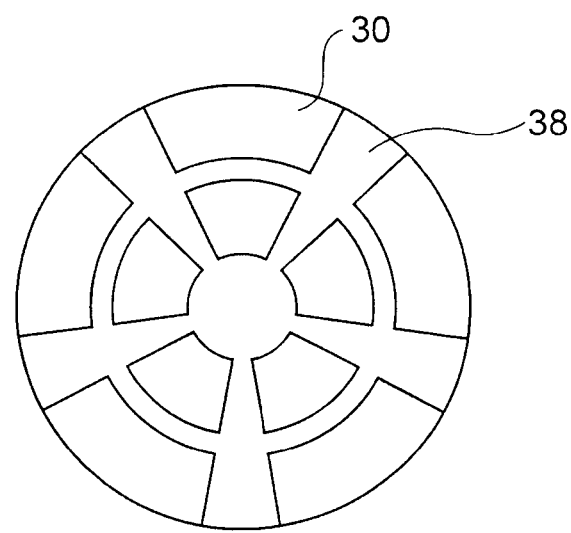
FIG. 6 is a front view of a reinforcement adapted for the tank in FIGS. 4A et 4B.

In FIG. 6, another example of embodiment can be seen in which the reinforcement is in the form a of flexible spider web 38 surrounding the pouch 29, and not in the form of a container 31.

Said reinforcement can be used in combination with the partition shown in FIGS. 5A and 5B.

An air reserve 40 is also provided to make the additional space formed by the empty container fit for human occupation.

For the inner furnishing of this additional space, pre-installed equipment can be used, these then being designed to withstand the pressure.

If no membrane is provided as in the first embodiment, the pre-installed equipment is designed so that it cannot be deteriorated by liquid fuel or oxidizer, which may infiltrate behind the protective panels.

Provision may also be most advantageously made for the use of inflatable equipment which can dampen impacts and avoid injury to passengers, such as those described in connection with FIGS. 2A and 2B.

Also, their installation is very swift, which is of particular advantage for sub-orbital spacecraft, the duration of gravity typically being 3 to 5 minutes for a flight between an altitude of 100 km and 160 km. Equipment which needs to be mounted is less advantageous given the short installation time.

Figure 7:
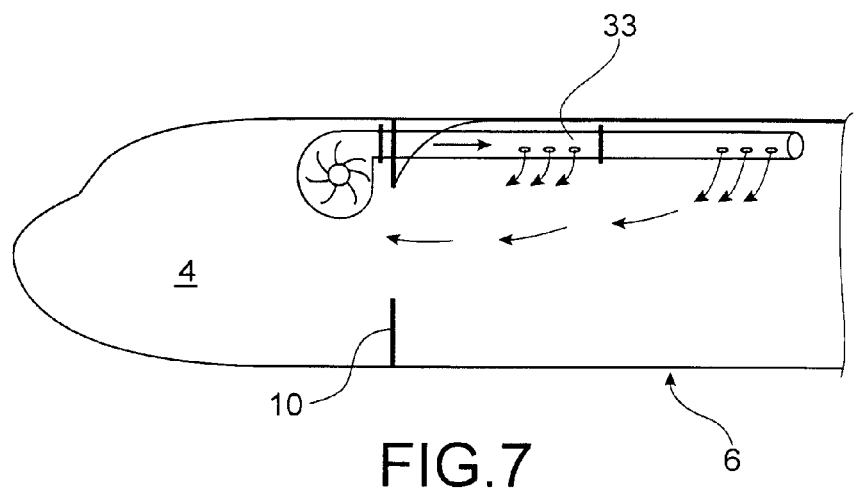
FIG. 7 is a schematic, longitudinal section of an air distribution and circulation system adapted for an aircraft according to the present invention.

For example, as illustrated in FIG. 7, an air distribution and recirculation system 33 is provided, which may also comprise inflatable ducts to bring air from the original cabin 4 to the additional cabin.

The pouch empties naturally owing to the difference in pressure between the inside of the aircraft (1 atmosphere) and the outside (vacuum) and via a valve 32 or via a valve of the propulsion system which takes the oxidizer to the combustion chamber.

Windows may also be provided in the convertible tank 6.

The container which forms part of the convertible tank can also be used as an airlock to perform action outside the spacecraft. For this purpose, all that is required is to close the access (hatchway 18) between the living compartment 4 and the convertible tank 6, to adjust the pressure by means of a valve or a pump, and to open hatchway 12 towards the outside. Therefore this space carries out a dual function of tank and airlock, allowing the total weight of the spacecraft to be reduced.

The conversion of the convertible tank will now be described.

After the launch of the spacecraft, the convertible tank 6 is empty; it can then be converted to additional accommodation space.

For this purpose, the pouch 29 is drained to remove any remaining fuel or oxidizer.

The pouch 29 is then folded away, for example by setting up a vacuum inside the pouch 29 by means of a vacuum pump or the natural vacuum in space; a livable atmosphere is then set up in the container 31 using an air distribution and circulation system under a determined pressure.

The inner space of the container 31 receiving the membrane 30 is then available for use as accommodation area.

Figure 8:
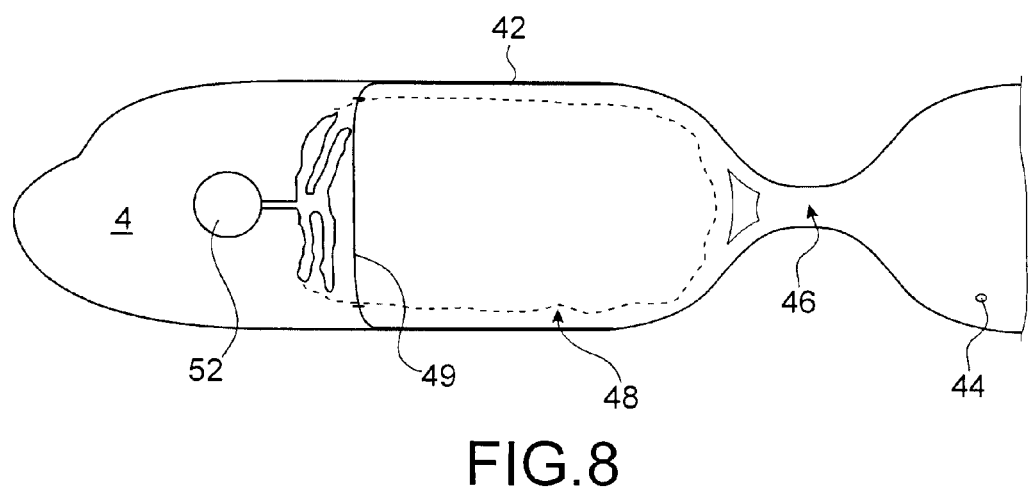
FIG. 8 is a schematic, longitudinal section of another embodiment of the present invention.

FIG. 8 illustrates a third embodiment of the present invention applied to a rocket comprising a propelling system with solid fuel and/or oxidizer equipped with a combustion chamber 42, a hatchway 49 is provided in the bottom part of the combustion chamber 42 on the side of the cockpit 4 to allow access to inside the combustion chamber from the cockpit 4.

The fuel is burnt in the combustion chamber 42 and is evacuated with the exhaust gases via a throat 46 and an exhaust nozzle 44. This combustion chamber 42 can then be converted to accommodation space for the crew by simply closing the throat 46 accessible via the hatchway 49.

Advantageously, provision may be made to cover the inner surface of the combustion chamber with a membrane 48, which advantageously can be deployed from within the cockpit. The membrane 48 is then protected from the heat produced in the combustion chamber. The membrane insulates the crew from any combustion residues and prevents pollution of the atmosphere in the rocket cabin, this membrane is deployed by means of an air reserve 52 connected to the inner volume of the membrane 48. An access (not shown) inside the membrane 48 is also provided.

The oxidizer tank can be located elsewhere in the spacecraft for a hybrid HTPB/nitrous oxide system. With a solid propulsion system, the oxidizer and fuel are already mixed in the chamber in a rubber matrix and hence ready for use.

Through this increase in the volume of accommodation space, the comfort of the crew is substantially improved by reducing the discomfort of confined spaces.

If there is a combustion chamber with HTPB and a tank of nitrous oxide, the tank can also be used as extension of the cabin space. With conventional rockets propelled by solid propellant, there is no tank, the propellants lying in the combustion chamber.

The present invention has the advantage compared with airplanes in which one of the tanks is removed to increase carry capacity on short-haul flights, in that it allows quicker, much easier conversion since the connections of the tank with the propulsion system are not modified. In addition, the structure of an integrated tank is more efficient than the structure of dismountable tank, and hence the airplane is less heavy and consumes less fuel.

The second embodiment advantageously applies to an airplane with kerosene as fuel, which it is desired to isolate from passengers and goods. However a tank could be used provided with a pouch to contain liquid hydrogen or any other "clean" fuel, which would allow fewer sealing restrictions in particular on the hatchway.

The invention claimed is:

1. An aircraft comprising:
a fuselage including a cabin to accommodate persons and a load and propulsion system;
the propulsion system comprising at least one tank, in which part of the propulsion system is used as an extension of the cabin and is configured to accommodate persons and/or cargo, the part of the propulsion system lying adjacent the cabin and separated from the cabin by a partition.

2. An aircraft according to claim 1, wherein the propulsion system comprises at least two tanks including a convertible tank and a plain tank, the extension of the cabin including the convertible tank.

3. An aircraft according to claim 2, further comprising a filter at an exit of the convertible tank to filter pollutants brought by passengers and/or the cargo in the convertible tank.

4. An aircraft according to claim 2, wherein the convertible tank comprises a flexible pouch to hold fuel or oxidizer, and a container to contain the pouch, the container forming the extension of the cabin once the pouch has been folded away.

5. An aircraft according to claim 4, wherein the partition is reinforced to withstand pressure exerted by the fuel in the pouch.

6. An aircraft according to claim 4, wherein a flexible reinforcement element in the shape of a spider web surrounds the pouch.

7. An aircraft according to claim 2, wherein the convertible tank comprises at least one hatchway formed in the fuselage to embark and disembark passengers and/or to load goods, at least one emergency evacuation exit, a communicating hatchway with the cabin, and a drainage means for draining remaining fuel.

8. An aircraft according to claim 7, wherein the communicating hatchway between the convertible tank and the cabin comprises a shoulder on its outer contour configured to bear against the partition in a tank-to-cabin direction under the force exerted by the fuel contained in the pouch.

9. An aircraft according to claim 2, wherein the convertible tank comprises a floor on which passengers can walk and/or on which a load can be stored.

10. An aircraft according to claim 2, wherein the convertible tank comprises attachment means for securing furnishing elements and/or inflatable furnishing means configured to be inflated when the convertible tank is converted to a cabin extension and/or furnishing elements concealed in the walls of the convertible tank.

11. An aircraft according to claim 1, further comprising an air distribution and circulation system provided between the cabin and the cabin extension.

12. An aircraft according to claim 11, wherein the air distribution and circulation system comprises inflatable ducts on the side of the cabin extension.

13. An aircraft according to claim 1 forming an airplane.

14. An aircraft according to claim 2, wherein the convertible tank and the plain tank are arranged on either side of the cabin in a longitudinal direction of the aircraft.

15. An aircraft according to claim 2, wherein the convertible tank and the plain tank are partly located in wings and partly in sidewalls of the aircraft, the convertible tanks being arranged in the sidewalls of the aircraft.

* * * * *